Nov. 20, 1928.

W. COOPER

ANIMAL TRAP

Filed April 12, 1927

1,692,158

INVENTOR
WILLIAM COOPER

BY
ATTORNEY

Patented Nov. 20, 1928.

1,692,158

UNITED STATES PATENT OFFICE.

WILLIAM COOPER, OF APALACHIN, NEW YORK, ASSIGNOR TO COOPER HUMANE TRAP CO., INC., OF BINGHAMTON, NEW YORK.

ANIMAL TRAP.

Application filed April 12, 1927. Serial No. 183,114.

My invention relates to traps and has for its primary object the provision of such a device for insuring the instant death of an animal caught therein. In this respect, my trap is humane and possesses advantages found in no other trap in use today.

It is an object of my invention to provide a trap having double swinging jaws, which when sprung provide a striking and gripping portion at both the front and rear as well as the top. This insures the catching of an animal venturing into the trap from any direction.

A further object is to provide a novel arrangement of trigger or releasing device which likewise insures against the escapement of an animal entering the trap.

Further advantages in details of construction and operation will be apparent as the description proceeds, reference now being had to the figures of the drawing wherein like reference numerals indicate like parts.

In the drawing:—

Figure 1:
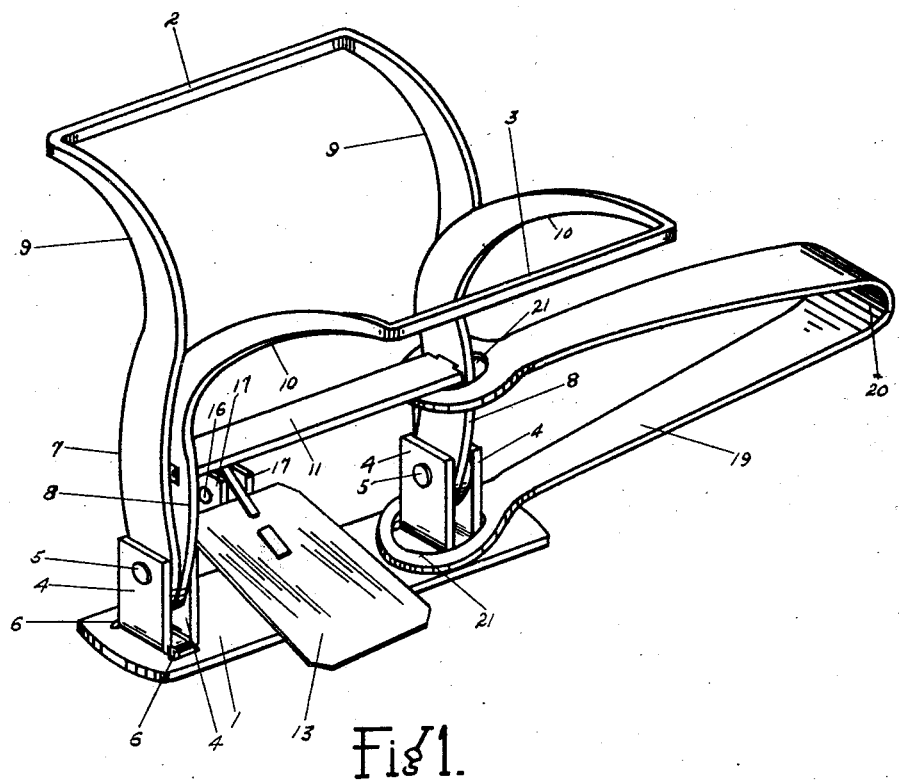
Figure 1 is a perspective view of the trap in sprung position.

The reference numeral 1 refers to a base plate or support upon which the jaws 2 and 3 are pivoted. Pivoted means are provided at either end of the base plate 1 comprising the upstanding spaced lugs 4 between which extend the pintles 5 on which the jaws 2 and 3 are pivoted. The bottom portion of the lugs 4 are turned downwardly at right angles as shown at 6 and clamped beneath the base plate 1 as at 7 to securely hold the lugs rigid with the base.

The jaws 2 and 3 are, as shown, substantially U-shaped with the free ends pivoted to the pintles 5. The side portions of the jaws are offset slightly adjacent the pivoted ends as at 7 and 8 and then offset to a greater degree adjacent the closed ends as at 9 and 10. The jaw 3 is slightly shorter than jaw 2 and when the jaws are spread to the setting position shown in Figure 2, the jaw 3 passes through the jaw 2 so that upon the closing of the jaws, the offset portions 9 and 10 cooperate to produce a gripping action from both the front and rear of the trap from which an animal cannot escape. Likewise the closed ends of the jaws 2 and 3 are so formed to pass each other in close proximity so that should an animal in some way get completely within the trap between the side portions of the jaws, these closed ends will surely close upon it.

Figure 2:
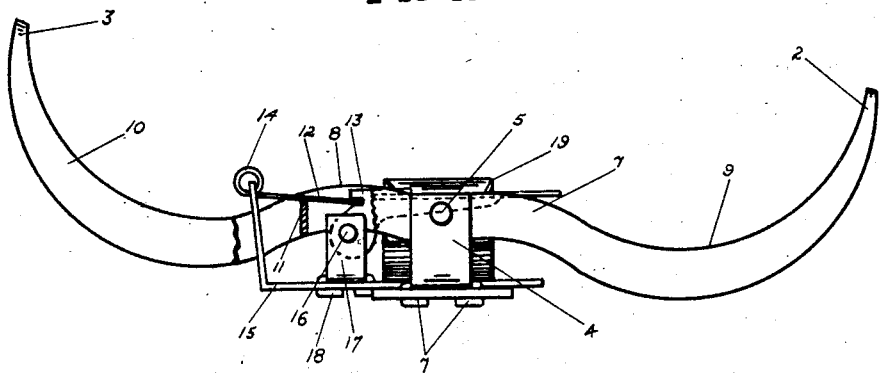
Figure 2 is an end view thereof in open position.

A cross bar 11 extends between the side portions of the jaw 3 over which the trigger lever 12 passes to engage with the trigger pan 13 when the trap is set as shown in Figure 2. The trigger lever 12 is pivoted at 14 to the upper end of an angle arm 15 suitably riveted or otherwise secured to the base plate 1. The trigger pan 13 is pivoted on the pintle 16 extending between the spaced upstanding lugs 17 secured to the angle arm 15 as at 18 in the same manner as the lugs 4 are secured to the base plate 1.

A heavy trap spring 19 bent upon itself as at 20 is provided with open ends 21 through which pass one set of side portions of the jaws 2 and 3. The openings 21 in the ends of the spring are formed to fit over the upstanding lugs 4 to which the jaws are pivoted and when the spring is compressed with both ends in position around the said lugs 4, the jaws may be pivoted to the set position shown in Figure 2 and the trigger or release device set to hold the jaws in such open position. When the trigger is operated to release the jaws, however, the tension of the spring 19 exerts itself and the upper portion of the spring acts upon the side portions of the jaws 2 and 3 to close such jaws with tremendous force. The cross piece 11 limits the upward movement of the spring.

It will be noted that an animal entering the trap from any direction and setting off the trigger is necessarily in a position to be caught either by the side portions of the jaws or by the closed upper portions thereof. It will furthermore be clear that when the animal is so caught, the jaws will be prevented from assuming the maximum position shown in Figure 1 by the body of the animal which is thus held by the full tension of the spring 19.

Of course, changes may be made by way of detail without departing from the spirit and scope of my invention. I do not limit myself, therefore, to the exact form shown other than by the appended claims.

I claim:—

1. An animal trap comprising a base plate, substantially U-shaped jaws normally separated in sprung position pivoted thereto at their free ends, the side portions of said jaws being curved to provide a gripping pocket between their coacting portions when closed upon an animal.

2. An animal trap comprising a base plate, a pair of substantially U-shaped jaws normally separated in sprung position pivoted thereto at their free ends, one of said jaws being smaller than the other to pass therethrough for setting, and the side portions of said jaws being curved to provide a gripping pocket between their coacting portions when closed upon an animal.

3. An animal trap comprising a base plate, a pair of substantially U-shaped jaws normally separated in sprung position pivoted at their free ends to said plate, a spring normally forcing said jaws together and a trigger for retaining said jaws separated.

4. An animal trap comprising a base plate, a pair of substantially U-shaped jaws normally separated in sprung position pivoted at their free ends, one of said jaws being smaller than the other to pass therethrough for setting, a spring normally closing said jaws, and a trigger positioned centrally of said jaws for retaining them in open position.

5. An animal trap comprising a base plate, a pair of substantially U-shaped jaws pivoted to said plate at their free ends, one of said jaws being smaller than the other to permit its passage therethrough for setting, a cross piece connecting the side portions of said smaller jaw, means normally closing said jaws, and a trigger cooperating with said cross piece for retaining said jaws in open position.

WILLIAM COOPER.